(12) United States Patent
Troxel et al.

(10) Patent No.: US 6,253,236 B1
(45) Date of Patent: Jun. 26, 2001

(54) SYSTEM AND METHOD FOR SERVING HOST COMPUTER FILES TO ONE OR MORE CLIENT COMPUTER SYSTEMS

(75) Inventors: Douglas D Troxel, San Mateo; Immanuel P Panis, Montara, both of CA (US)

(73) Assignee: Serena Software International, Inc., Burlingame, CA (US)

( * ) Notice: Subject to any disclaimer, the term of this patent is extended or adjusted under 35 U.S.C. 154(b) by 0 days.

(21) Appl. No.: 09/081,734

(22) Filed: May 19, 1998

(51) Int. Cl.[7] .................................................. G06F 13/00
(52) U.S. Cl. ..................... 709/217; 709/229; 709/219; 709/203; 710/200; 710/10
(58) Field of Search ............................. 709/203, 202, 709/217, 219, 228, 229; 336/79, 88, 379, 202; 707/8, 9, 200, 201, 203

(56) References Cited

U.S. PATENT DOCUMENTS

| | | | |
|---|---|---|---|
| 5,146,561 | * | 9/1992 | Carrey .................................. 709/203 |
| 5,734,909 | * | 3/1998 | Bennett ................................ 710/200 |
| 5,862,346 | * | 1/1999 | Kley et al. ............................ 709/245 |
| 5,893,116 | * | 4/1999 | Simmonds et al. .................. 707/201 |
| 6,061,683 | * | 5/2000 | Alonso .................................... 707/8 |
| 6,061,686 | * | 5/2000 | Gauvin et al. ......................... 707/10 |
| 6,073,161 | * | 6/2000 | DeBoskey et al. .................. 709/200 |

* cited by examiner

Primary Examiner—Moustafa M. Meky
Assistant Examiner—Abdullahi E. Salad
(74) Attorney, Agent, or Firm—Charles E. Gotlieb

(57) ABSTRACT

A system and method allows a host computer to operate as a server in a client-server arrangement in response to requests from client computer systems. The system and computer program product performs reads, reads for update, update and deletes on some or all records in a file, depending on the type of file. Record or file locking is provided when applicable. Security is provided at the file level. Abnormal ends of communication with the client computer system are detected to allow resources and record or file locks to be freed in such event. A counter is incremented at the time a client computer system logs into the host computer system to enforce limits on the number of concurrent users, and ordinary log off as well as abnormal ends of communication decrement the counter to maintain its accuracy.

42 Claims, 5 Drawing Sheets

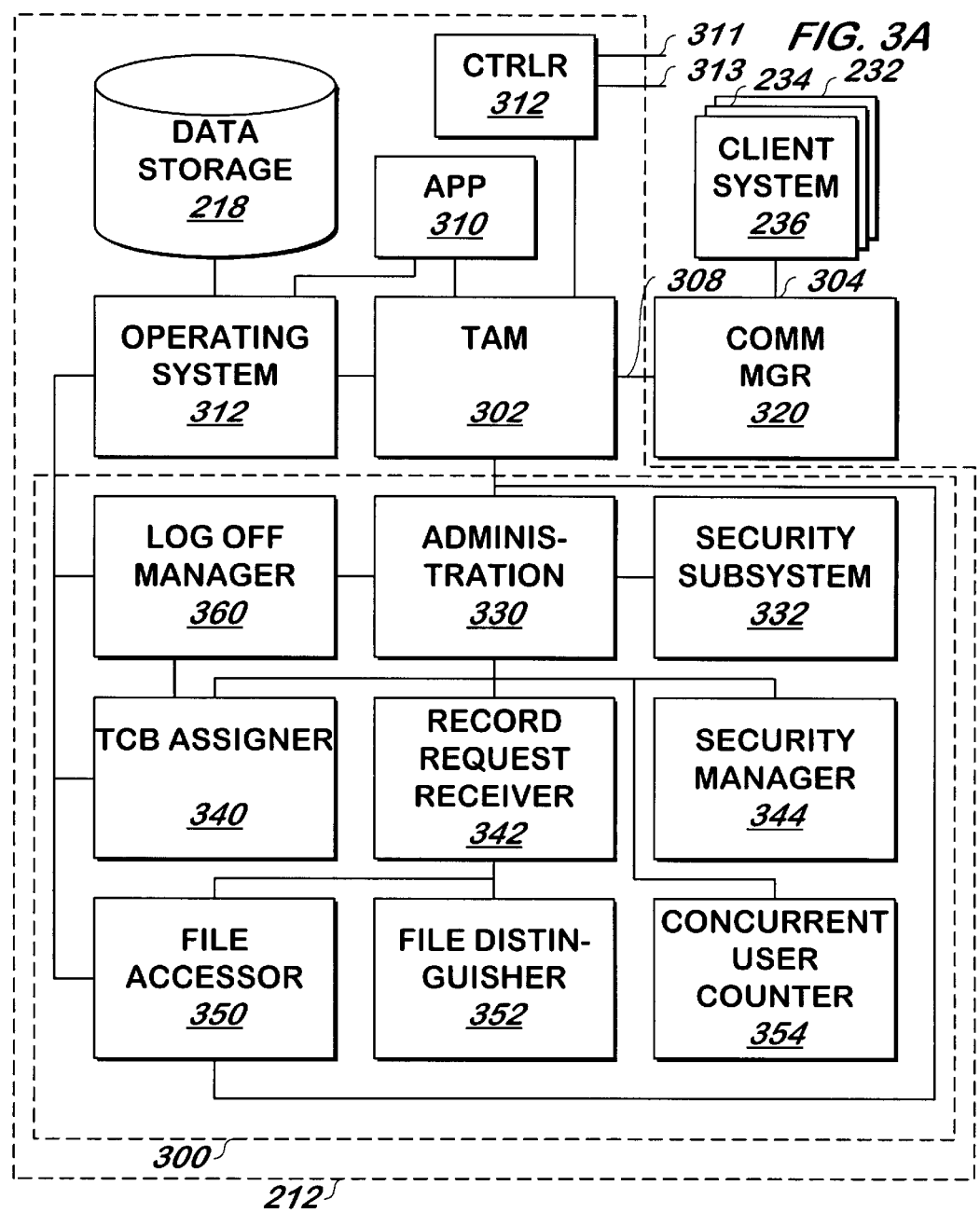
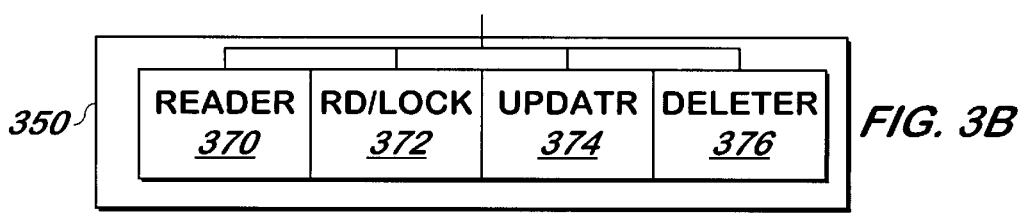

SYSTEM AND METHOD FOR SERVING HOST COMPUTER FILES TO ONE OR MORE CLIENT COMPUTER SYSTEMS

FIELD OF THE INVENTION

The present invention is related to computer software and more specifically to client-server computer software for a host computer system.

BACKGROUND OF THE INVENTION

Computer systems are used to process data. Data may be processed by client-server computer systems or by mainframe computers in a host-computer architecture.

In a client-server computer system, one or more client computer systems can request data from a server computer system. The server computer system provides the client computer system with the requested data for processing and/or display by the client computer system. The client computer system can also transmit data to the server computer system for storage. This data can replace or supplement the data on the server computer system. If the client computer system requests data from the server computer system with the possibility that the data may be changed and stored back onto the server computer system, the client computer system instructs the server computer system to lock the portion of the data so requested. Locking the data prohibits other client computer systems or the server computer system from altering or locking the data being processed by the first client computer system. Locking prevents conflicts between the client computer system requesting the data for possible update, and other client computer systems that may attempt to change the data requested by the first client computer system before it is updated by that client computer system.

Client-server software developed for client-server systems may be used to handle the special needs of client-server systems. These needs include locating and providing requested data, handling the record locking on the server and prohibiting some types of access on locked data, and updating the data received from the client.

Client-server software also serves to prohibit a client that has locked a record from keeping one or more records locked by the server perpetually if the client computer system and server system cease communicating. This termination in communication can be caused by communication problems between the client and the server, or termination of the program in the client that communicates with the server, such as if the client computer system crashes or is restarted by the user. Unlike host-based environments, in which a large mainframe computer system is under sole control of an MIS department, client computer systems are often accessible to their users, and can be restarted by the user or can crash due to other software running on the client computer system.

Host computer systems use a different arrangement to process data. Data is processed and stored on a computer system such as a mainframe computer system, and communicated to terminals connected to the mainframe computer system. In the case of some mainframe operating systems such as the MVS operating system, or the MVS operating system with the QSAM file access method, both commercially available from IBM Corporation of White Plains, N.Y., the application program in the mainframe is responsible for handling conflicts between users for the same data and for recovering from communication errors with the user. For example, the VSAM file access method commercially available from IBM Corporation of White Plains, N.Y. can enforce record locking, but does not prevent a record from becoming perpetually locked.

Some companies use both types of computer systems. A host computer system is used to operate transactionintensive critical applications. An example of a transaction-intensive critical application for an airline is the reservation system that assigns seats, provides tickets, and charges credit cards. A client-server system may be used to operate ancillary applications such as an employee scheduling system or a sales reporting system.

Sometimes, some of the data that may be useful in the client-server system is contained in the critical application operated on the host computer. For example, changes input to the host-based computer reservation system could be used to adjust the client-server employee scheduling system. Additionally, reservation information stored in the host-based computer reservation system could serve as input to the client-server sales reporting system.

One way to transfer information from a host computer system to a client-server system is to periodically copy the file in the host computer system to a separate server computer system. Although this arrangement allows server software to be used to perform the record locking and communication termination functions described above, this arrangement suffers from several drawbacks. First, the data on the server system is never current, prohibiting the client-server system from receiving the most up to date information. Second, the client-server system is not able to change the data in the host. For example, if changes are made to the reservation system for which employees cannot be found, it might be desirable for the client-server employee scheduling application to adjust the schedule in the reservation system.

One potential solution to this problem is to use the host as a server, and require the client to emulate the terminal connected to the host. However, the application on the host computer may not provide the functions required to supply multiple records to the client efficiently, and the application may be difficult to re-program.

It would be desirable to allow the host to act as a server for each client computer system. However, there are several difficulties with this approach. First, a means of prohibiting conflicts must be supported without allowing a client computer system that terminates communication with the host to perpetually lock records. Second, if the client computer system terminates communication with the host, host resources such as memory that were allocated to the client computer system must also be freed. Third, if the application that created and uses the data does not use a file access method supporting record locking, a different arrangement to prevent conflicts must be used on such files. Fourth, although many host computers contain a security system that allows an administrator to prohibit types of access to certain partitioned data sets, such security may not provide adequate granularity if access to data must be provided on a file basis.

What is needed is a method and system that can allow one or more client computer systems to access data on a mainframe host, can prevent conflicts for data stored under different types of file access methods, provide security at a file level and recover from interruption of communication between the host and client computer systems.

SUMMARY OF INVENTION

A method and system receives commands to access data stored on a host computer system from one or more client computer systems and executes the commands it receives.

Access can include read, read for update, update and delete one or more records from a file. The method and system allows access to "live" data, or data that is also accessible to one or more applications executing on the host. The security system of the host computer may be used to deny access to the partitioned data set containing the data. An optional security system can be used to prohibit a user who would otherwise be granted permission by the host security system to access a partitioned data set from accessing certain files within the partitioned data set. If the file access method used to access the file supports record locking, records of the file may be locked if the records are requested for the purpose of updating them. If the file access method used to access the file does not support record locking, the entire file can be locked. The records or file is unlocked when the client computer system updates the data. If the client computer system terminates communication with the host computer system, the method and system signals the host computer system, so that it may unlock records or files locked by that client computer system, and free the resources allocated to the client computer system for use by other processes.

BRIEF DESCRIPTION OF THE DRAWINGS

FIG. 3A is a block schematic diagram of a system for accessing files stored on a host by one or more client computer systems according to one embodiment of the present invention.

FIG. 3B is a block schematic diagram of a file accessor of FIG. 3A according to one embodiment of the present invention.

DETAILED DESCRIPTION OF A PREFERRED EMBODIMENT

Figure 1:
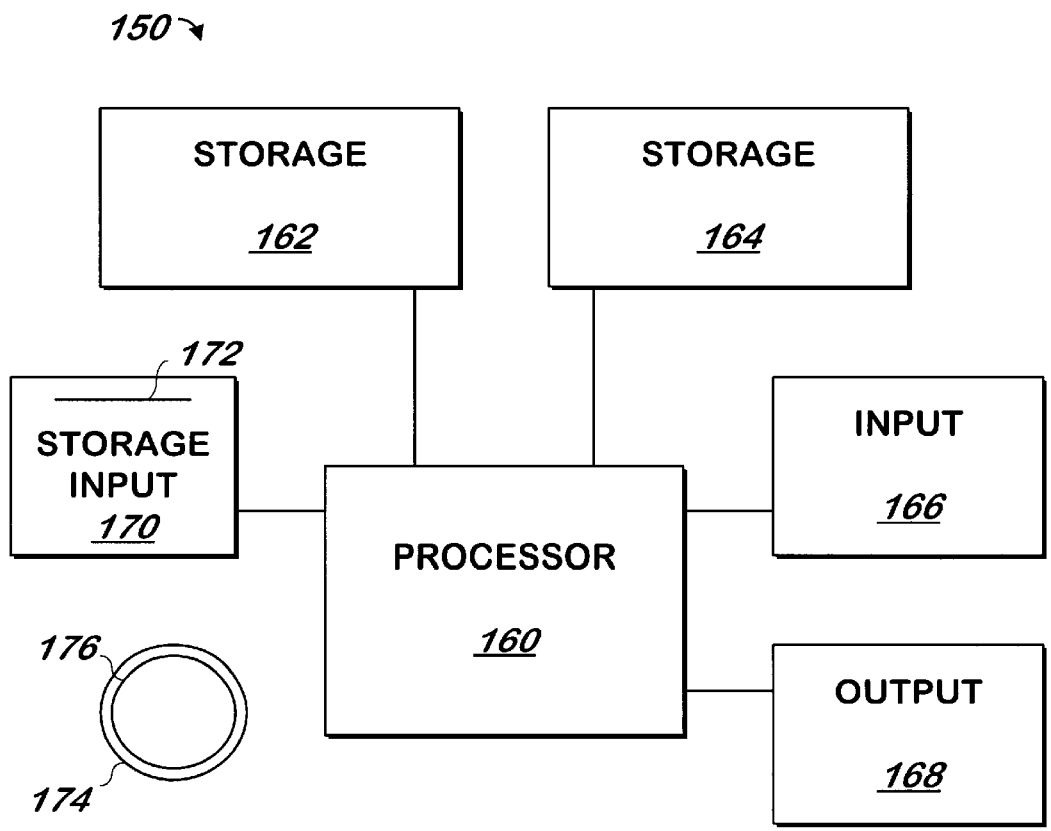
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

Figure 2:
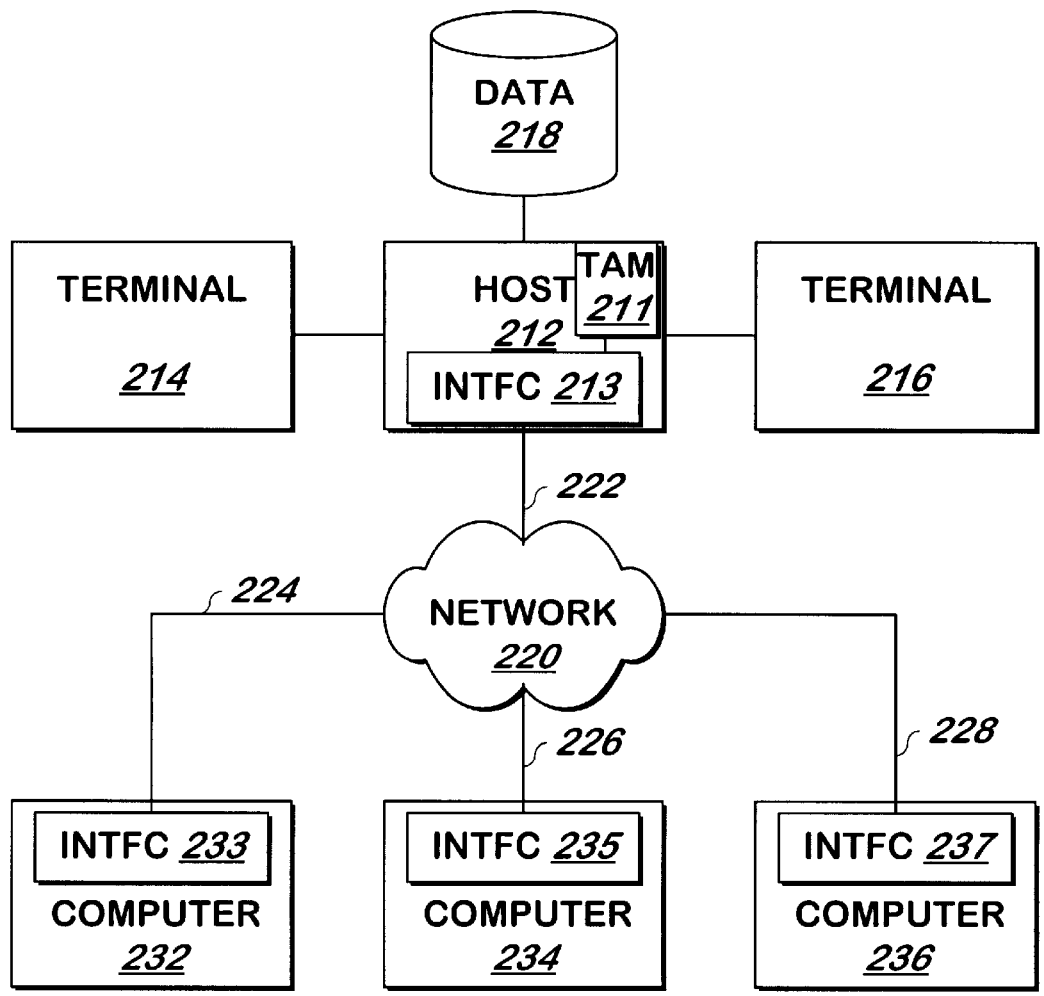
FIG. 2 is a block schematic diagram of a client-server system with a host acting as the server according to one embodiment of the present invention.

Referring now to FIG. 2, the operating environment of one embodiment of the present invention is shown. Client computer systems 232, 234, 236 are coupled to host computer 212 via interfaces 213, 233, 235, 237 and connections 224, 222, 226, 228 into a conventional network 220 such as an ATM network or Ethernet LAN. Host computer system 212 runs conventional telecommunications access method 211 such as the VTAM product commercially available from IBM Corporation of White Plains, N.Y., either as part of, or in addition to, the operating system of the host 212. Host computer system 212 is coupled to data storage device 218, such as a conventional DASD or any other storage device. Data storage device 218 need not be directly connected to host computer system 212, but may be connected via the network 220 or via another computer system not shown that is coupled to host computer system 212. Conventional computer terminals 214, 216 may also be connected to host computer system 212 to operate a conventional host application program, such as a seat reservation system.

In one embodiment, client computer systems 232, 234, 236 are conventional Pentium-class IBM-compatible personal computers, commercially available from IBM corporation of White Plains, N.Y. running the Windows NT operating system commercially available from Microsoft Corporation of Redmond, Wash., suitably equipped with TCP/IP communications software and network interface cards. Host computer system 212 is a conventional System 390 computer running the MVS/ESA version 5.2.2 or OS/3090 version 1.3 operating systems, all commercially available from IBM Corporation of White Plains, N.Y., with suitably equipped communications controllers configured for TCP/IP operation.

Referring now to FIG. 3A, a system 300 for accessing for one or more client computer systems files stored on a host computer system is shown according to one embodiment of the present invention. In one embodiment, the system 300 runs on a host computer system 212 as a started task of the VTAM subsystem commercially available from IBM Corporation of White Plains, N.Y. Once started, a started task runs until it is shut down either manually, due to an operator command, or automatically, for example due to a system crash of the host computer system.

In one embodiment, one or more clients 232, 234, 236 sends commands requesting access to the system 300. Commands are received at input 304 via communications manager 320. Communications manager 320 passes the commands to telecommunications access method 302 such as VTAM in one embodiment, or the commands may be passed to the telecommunications operating system 302 via operating system 312. In one embodiment, the communications manager 320 is a conventional 3745 communications controller suitably equipped to handle and communicate using the TCP/IP protocol commercially available from IBM Corporation of White Plains, N.Y. In one embodiment, the interface in each client computer system 232, 234, 236 converts the commands into one or more TCP/IP messages and transmits them to the communications manager 320. Communications manager 320 reassembles the command sent from the client computer system by stripping off bits used by the protocol. Communications manager 320 sends these commands to telecommunications access method 302. Telecommunications access method 302 passes the commands to administration 330.

In one embodiment, client computer systems must log on to the system 300 as described below. In another embodiment, no explicit log on command is required, and the user is logged on automatically when any other command is received from a client computer system. In the embodiment described below, a log on command procedure is described. However, this same procedure, or other similar procedures may be used in response to the receipt of the first command from a client computer system.

In one embodiment, the system 300 of the present invention enforces a limit on the number of client computer systems 232, 234, 236 that may concurrently use the system 300 at any one time. When a client computer system 232, 234, 236 attempts to log into the system by sending to the system a "log on" command, administration 330 signals concurrent user counter 354. Concurrent user counter 354 stores of the number of concurrent users that are authorized to use the system 300 of present invention and the number of concurrent users presently using the system 300. When signaled by administration 330, concurrent user counter 354 identifies whether the number of users using the system is less than the number of users authorized to use the system. If not, concurrent user counter 354 signals administration 330 which denies the client computer system 232, 234 or 236 the ability to log on to the system 300 by sending a message to such client computer system 232, 234 or 236. If the number of users using the system is less than the number of users authorized to use the system, concurrent user counter 354 increments the number of users using the system and signals administration 330 to allow the log on to proceed.

If the command received by administration 330 is a log on command, administration 330 signals TCB assignor 340 to assign a TCB to the connection 304 over which the command arrived. In one embodiment, the communication manager 320 appends to all commands it receives an identifier of the connection connected to the client computer system that uniquely identifies each client computer system logged on to the system 300, and such connection identifier is forwarded to administration 330. Administration forwards the connection identifier, username and password to TCB assigner 340. TCB assignor 340 requests from operating system 312 a task control block and includes in the request the username and password that was sent by the client computer system 232, 234, 236 as part of the log on command and forwarded to TCB assigner 340 by administration 330. Operating system 312 assigns a task control block and allocates resources such as memory to the task control block. Operating system 312 returns an identifier of the task control block to TCB assignor 340. TCB assignor 340 stores the task control block identifier, the identifier of the connection 304 from which the log on command was received and the username in a table or list, with each of these three data items associated with each other. TCB assignor 340 signals administration 330 that the task control block has been properly assigned. Administration 330 sends a confirmation of the log on to the client computer system 232, 234 or 236 that sent the log on command via telecommunications access method 302. Telecommunications access method 302 provides the response to communications manager 320. Communications manager 320 formats the response according to the protocol used by the communications manager 320 and passes one or more messages corresponding to the command so formatted to connection 304 to be transmitted to the client computer system from which the log on command was received.

Once logged in as described above, other commands may be received from a client computer system 232, 234, 236. These commands include a read command, a read for update command, an update command, a delete command and a log off command, each described in more detail below. These commands received are passed to administration 330 as described above.

With respect to the read, read for update, update and delete commands, each command can contain a filename in which the desired record or records are stored, a record identifier, and a number of records or record range identifiers to identify less than all of the records in the file. In one embodiment, administration 330 verifies with a security subsystem 332, such as the RACF system commercially available from IBM Corporation of White Plains, N.Y., that the user has the type of access, either read or write, to perform the command on the partitioned data set containing the file described in the command. Administration 330 requests the task control block identifier from TCB assignor 340 and passes the filename and task control block to the security subsystem 332. Security subsystem 332 identifies whether the user corresponding to the task control block has access to the partitioned data set containing the file described in the command in the manner specified by the command. For example, a user may only have read access to a file, and if the command is a read for update command, security subsystem 332 will indicate denial to administration 330. Administration 330 signals client computer system of the denial via the telecommunications access method 302, indications manager 320, operating system 312 as described above.

In another embodiment of the present invention, access to the file is approved or denied automatically when the access request described in more detail below is made to the operating system 312. When administration 330 receives a command after a log in command, administration 330 provides to TCB assignor 340 the connection identifier it receives as described above. TCB assignor 340 returns the TCB identifier to administration 330 and administration 330 provides it to file accessor 350 with the command. When file accessor requests operating system 312 to execute the command as described below, it includes the TCB identifier with the request. Using security subsystem 332, operating system 312 uses the TCB identifier to check whether the user has access to the partitioned data set to perform the request.

An optional security manager 344 may be employed to provide a finer level of granularity of denial of access than may be supplied by security subsystem 332. For example, if the security subsystem 332 is the RACF subsystem, the client computer system must either be granted or denied access to all files in each partitioned data set. Administration 330 can accept security commands from any client computer system 232, 234, 236 as described above if a special administrator username and password are used to log on to the system as described above. Each security command describes a file or group of files, and a username or group of users who are to be denied read or write access to the file. The administration of 330 passes these commands to security manager 344, which stores the names of these files and usernames or user group names and type of access to be denied.

When an access command is received by administration 330, either before or after the security subsystem 332 grants access to the file, administration 330 uses the identifier of the connection over which the command was received to request from TCB assignor 340 the name or other identifier of the user under which the client sending the command logged in. TCB assignor 340 provides the user identifier to administration 330. Administration 330 provides this identifier, the filename contained in the command received, and type of access corresponding to the command to security manager 344. Security manager determines whether access to this file is to be denied using the filename, the user identifier, type of access, and prior security commands received and stored, in a table in one embodiment. Security manager 344 may deny access by signaling administration 330, which informs of the user of this denial similar to the procedure described above with respect to denial by security subsystem 332. If security manager at 344 does not indicate that access is denied, or security manager 344 is not in use, administration 330 passes the command to record request receiver 342.

Record request receiver 342 identifies the type of file corresponding to the command received for some or all of the commands received. In one embodiment, commands to access different file types may be treated differently by the apparatus 300 of the present invention as described in more detail below. In one embodiment, each file has one of two types: the first type of file is a VSAM file, and the second type of file is not a VSAM file. Record request receiver 342 performs the function of identifying the type of file by passing the filename contained in the command to file distinguisher 352. File distinguisher 352 distinguishes the type of file using the filename of the file contained in the command in one embodiment. In another embodiment, the client computer system 232, 234, 236 or another client computer system such as a system under control of a system administrator is required to register the type of each file by including the type of file in the command, or using a special registration command received by administration in a similar fashion to the receipt of other commands. Administration provides this registration command to record request receiver 342, which passes the registration command to file distinguisher 352. File distinguisher 352 then records the type of the file for use in determining the type of file corresponding to the filename of the current and/or subsequent commands. When a current or subsequent command is received with the filename, file distinguisher 352 provides the type of the file to record request receiver 342. Record request receiver 342 then passes the command and the type of the file to file accessor 350.

Referring now to FIGS. 3A and 3B, a file accessor 352 of FIG. 3A is shown in more detail in FIG. 3B according to one embodiment of the present invention.

If the command is a read command which does not involve an update, reader 370 of file accessor 350 uses the filename and type of file to pass a command to operating system 312 to retrieve the file having the filename in the command, or portion of the file described by the command if such capability to retrieve a portion of a file exists for that type of file in operating system 312 as described in more detail with reference to FIG. 4A below. Operating system 312 retrieves the file or portion identified from data storage 218 and provides file to file accessor 350. File accessor provides the file or portion of the file received from operating system 312 to telecommunications access method 302, which provides the file to the client computer system via communications manager 320.

In one embodiment, the command received from the client computer system 232, 234, 236 contains a parameter that the file or records from the file are to be converted from ASCII to EBCDIC. File accessor 350 performs this conversion prior to sending the file or portion of the file requested. In another embodiment, a parameter of the command received instructs file accessor 350 to compress the file or records provided. File accessor 350 compresses the file prior to sending it using conventional compression techniques.

In one embodiment, the command received from client computer system 232, 234, 236 describes the fields of the records to return. File accessor 350 extracts such fields from the copy of the records it receives and sends only those fields to telecommunications access method 302.

If the command is a read for update command, read/lock 372 of file accessor 350 sends to operating system 312 a command to lock the file or portion of the file to be read based on the type of file received as described above. The command may simultaneously lock and read the specified records in the file. For example, if the type of file provided by file distinguisher 352 is a VSAM file, file accessor 350 uses a "read direct" command which locks one or more records of the file before such records are provided by operating system 312. The records specified in the command received by file accessor 350 are used in the read direct command to identify the records to be read and locked. If the type of file is not a VSAM file, file accessor 350 sends to operating system 312 an ENQ command to lock the entire file having the name received in the command received by file accessor 350. File accessor 350 next provides to operating system 312 a command to provide the file. File accessor 350 receives and provides the entire file or the portion of the file specified in the command received to the requesting client computer system 232, 234 or 236 as described above. The portion requested in the command may be provided by the operating system if the file type permits the operating system to provide the file as is the case with VSAM files. Alternatively, the portion may be extracted by file accessor 350 after it receives the copy of the file from operating system 312. The file may be translated from EBCDIC to ASCII, or compressed by file accessor 350 as described above. Fields of each record may be extracted and only those fields provided by file accessor 350 as described above.

If the command received by file accessor 350 is an update command, the records or file to be updated is received as a part of the command. Accessor 350 may convert the records or file from ASCII to EBCDIC and/or decompress the records or file received if parameters indicating these actions are received as part of the update command. Updater 374 of file accessor 350 receives and then provides the records to be updated or the entire file, depending on the type of the file, to operating system 312. Operating system 312 then replaces the records or the entire file in place of the records or the file stored in data storage 218. If only certain records are to be replaced, the command received from the client computer system describes the number of the record or records to be updated, and file accessor 350 provides this information to operating system 312 to perform the update.

In one embodiment, file accessor 350 receives the entire file during a read command and provides only the portion of the file requested, such as certain records or fields of certain records. In such embodiment, file accessor 350 retains the portion not provided. When an update is requested over the same connection as the read for update on the file, the client computer system 232, 234, 236 need only provide the records to be changed and a description of the location of the records of the file in data storage 218 to be replaced by the records received by file accessor 350. File accessor 350 may perform the insertion using the copy of the file it retained during the read for update command, and then provide the entire file so modified to operating system 312 to be inserted into data storage 218 in place of the existing file.

If the command received from record request receiver is a delete command, deleter 376 of file accessor 350 deletes records in the file that are indicated in the command received if the file is of the VSAM file type using conventional READDIR and DELETE commands. If the file is not of the VSAM file type, deleter 376 locks and receives the file after passing the appropriate commands to operating system 312. Deleter 376 locates the record or records indicated as to be deleted in the command, deletes the record, and then requests operating system 312 to store the file back into its original location and unlock the file. Alternatively, deleter 376 locks the entire file and requests a copy of it from operating system 312. Deleter 376 sends the copy to the requesting client computer system 232, 234 or 236 for the client computer system 232, 234 or 236 to locate and delete the record or records to be deleted. The client computer system 232, 234 or 236 may then update the file as described above.

If communication between the client computer system 236 and the host 212 is interrupted, communications manager 320 identifies such interruptions using conventional watchdog timer or other conventional detection techniques. Communication may be interrupted if the communication line has a fault or if the application in the client computer system communicating with the communication manager 320 stops operating due to a system crash or other event. Communications manager 320 signals telecommunications access method 302 with an identifier of the connection 304 to the client computer system 236 over which communications have been interrupted. Telecommunications access method 302 signals administration 330 with this identifier. Administration 330 signals log off manager 360 with the identifier of the connection 304. Log off manager 360 provides TCB assignor 340 the identifier of the connection 304. TCB assignor 340 returns to log off manager 360 the TCB associated with that communications line 304. Log off manager 360 instructs operating system 312 to log off the user associated with the TCB received from TCB assignor 340. Operating system 312 logs the user off by reassigning the TCB and associated resources to the lists of unused TCBs and unused resources, respectively, that it maintains to identify available TCBs and resources. Additionally, if any records or files are locked as described above, operating system 312 unlocks them so that other users can access the formerly locked records or file.

If the system 300 tracks the number of concurrent users as described above, administration 330 signals concurrent user counter 354 to instruct it that it one user has logged off the system. Concurrent user counter 354 decrements the number of users presently using the system 300.

In one embodiment, a client computer system 232, 234, 236 can send a "log off" command, which is passed to administration as described above with reference to other commands. The command received by administration 330 contains the connection identifier appended by communications manager 320 as described above. Administration 330 logs the user off by passing the message to logoff manager 360. Logoff manager logs the user off using the same procedure as described above.

In one embodiment, conventional application program 310 also resides on the host computer system 212 and is coupled to conventional computer terminals (not shown) via connections 311 and 313, conventional communication controller such as the conventional 3745 communications controller commercially available from IBM Corporation of White Plains, N.Y. and telecommunications access method 302. Application 310 accesses via operating system 312 the same file or files stored in data storage 218 as those being accessed by the system 300 of the present invention, either simultaneously or very soon before or after. This allows the client computer systems 232, 234, 236 to access "live" files also being accessed by the system 300 of the present invention.

Figure 4A:
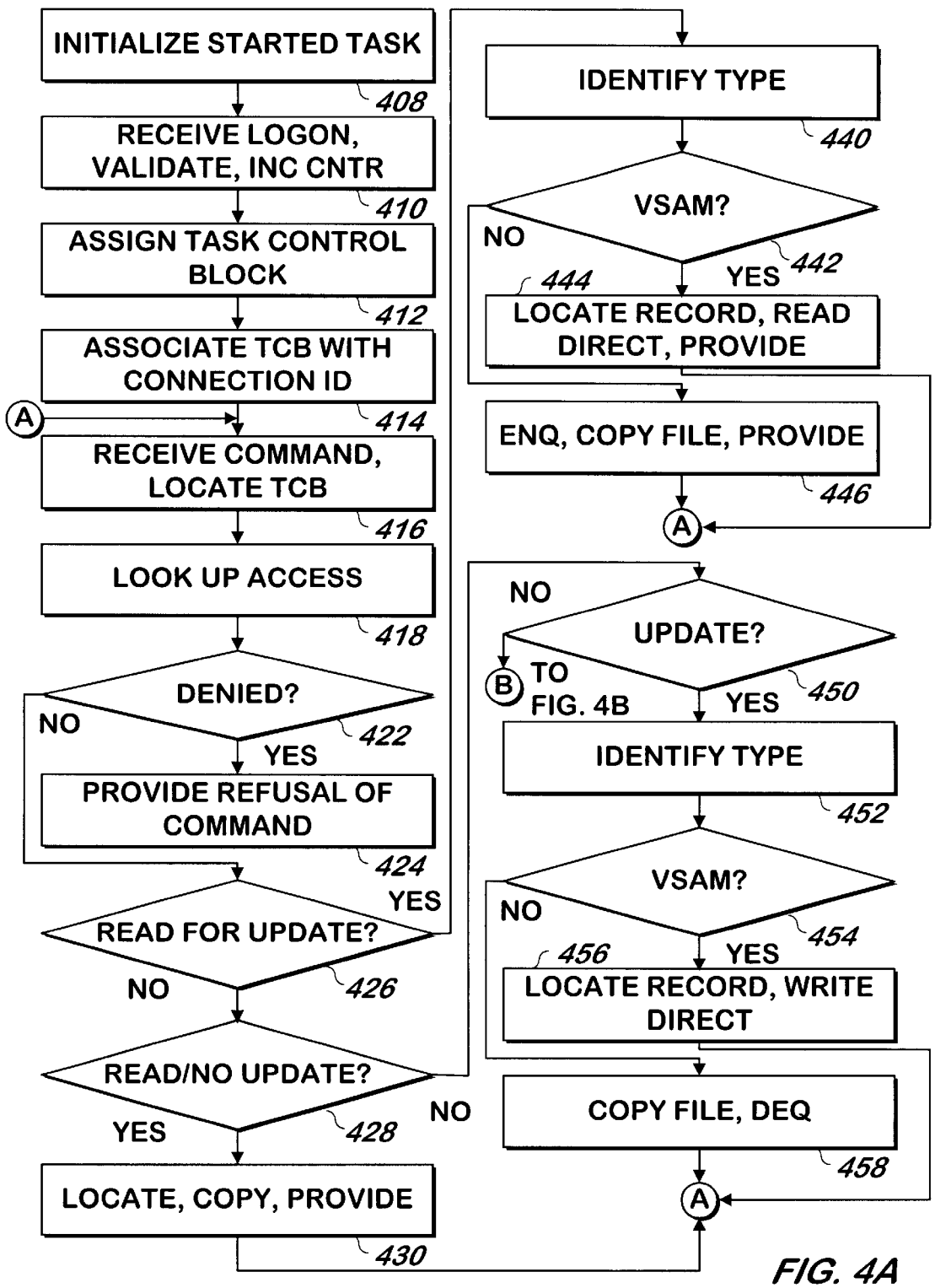
FIG. 4A is a flowchart illustrating a method of accessing for a client computer system a file stored on a host according to one embodiment of the present invention.

Referring now to FIG. 4A, a method of providing access to a file is shown according to one embodiment of the present invention. A started task is loaded 408. The started task may be a VTAM started task, or any other computer-resident similar capability. In one embodiment, the started task loaded in step 408 contains instructions that cause a computer to perform some or all of the remaining steps of the method of FIGS. 4A through 4C described below. In one embodiment, the started task loaded is capable of directly communicating with one or more client computer systems, via a telecommunications access method and/or controller and protocol converter without requiring the operating system for communications support. In another embodiment, the started task loaded in step 408 communicates with the client computer system indirectly via an operating system.

A log on command is received 410. In one embodiment, the log on command contains a user ID and password used to validate a user to a computer system. In one embodiment, the log on command also includes an identifier of the connection between two computers: a host computer system and a client computer system. In one embodiment, the method supports simultaneous users logged onto the system, and a limit on the number of users simultaneously logged onto the system is enforced. The number of users currently logged onto the system is compared against this limit, and only if number of users currently logged onto the system is less than this limit, the user is allowed to proceed and a counter is incremented 410. Otherwise, a message is provided to inform the user that the logon command did not succeed.

A task control block is assigned 412. In one embodiment, step 412 includes requesting a task control block by providing the user ID and password received from the log on command in step 410, for example to an operating system, and receiving an identifier of a task control block. In one embodiment, the task control block identifier received in step 412 is associated and stored 414 with the identifier of the connection received in step 410 and the user ID received in step 410.

A command is received 416 over a connection and the identifier of the connection is received along with command 416. In one embodiment, the command may contain an action such as read, read for update, update or delete. The command may contain a file name containing records on which to perform the action, a record identifier of the first record on which to perform the action in the command and a number of records including and following the first record on which to perform the action. The task control block associated with such connection in step 414 is located, and used to identify 418 whether the user has access to the file contained in the command as described above. If access to the file is not sufficient to perform the action in the command received in step 416, the command is refused 422, 424 by sending to the client over the connection a message indicating that access to the file is denied. In one embodiment, steps 418 and 422 may be performed on two levels, in any order: access to the partitioned data set containing the file is checked. If access to the partitioned data set containing the file is not granted to the user as described above, the user command is refused by providing a denial of access message via the same connection as was used to receive the command. If access to the partitioned data set is granted, a list of files not accessible to the user either for read access, write access, or both is also checked as described above. If the file contained in the command received in step 416 is on this list corresponding to the action of the command and the user ID of the user, a response indicating refusal of the command is provided. If access to the file for the action requested in the command received in step 416 is not blocked by either of these two levels (checking the partitioned data set first and then the list of files, or the list of files first and then the partitioned data set), the method continues at step 426.

If the command received in step 416 is a read for update command 426, the method continues at step 440. In one embodiment, the type of file specified in the request is identified as described above 440, for example by using the filename or other characteristic of the file, or by using a registration procedure described above. If the file type is a VSAM file 442, the record is located in the file, locked and retrieved using a VSAM "read direct" command, and provided 444 over the connection from which the request was received in step 416. If the type of file is not a VSAM file, the entire file is locked using the MVS ENQ command, copied and provided to the client over the connection from which requested step 416 was received. The method continues at step 416.

If the command received in step 416 is a read command, implying no update 428, in one embodiment, the entire file is copied 430. In another embodiment, only the records specified in the command received in step 416 are located and copied. Referring momentarily to FIG. 4C, step 430 of FIG. 4A is shown in more detail. The type of the file received in step 416 is identified as described above 430A. In the file is of type VSAM 430B, the records requested in the command are located, read and provided over the connection over which the command was received 430C. otherwise, the entire file is copied and provided 430D, or the entire file is copied but only the records requested in the command are located and provided. Referring again to FIG. 4A, if the command received in step 416 is not a read command 428, the method continues at step 450.

Figure 4B:
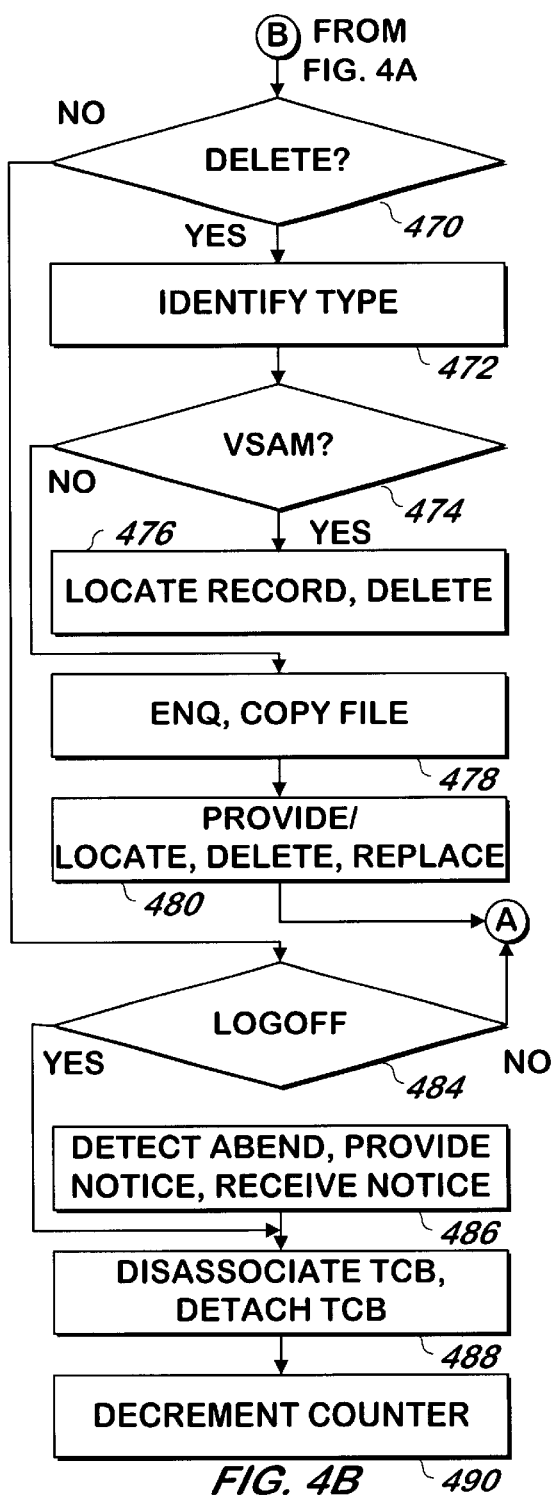
FIG. 4B is a flowchart continuing the flowchart of FIG. 4A.
Figure 4C:
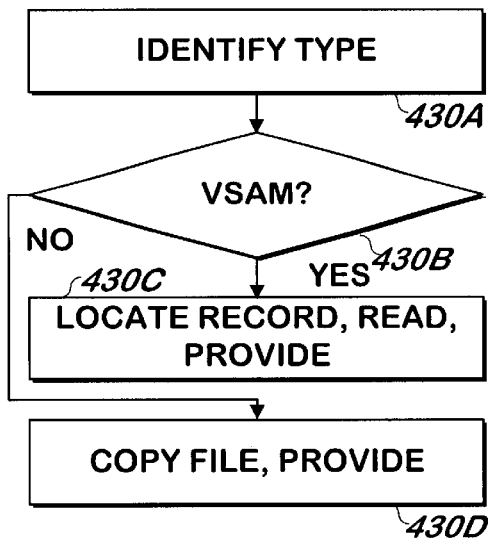
FIG. 4C is a flowchart illustrating in more detail a step of FIG. 4A.

If the command received in step 416 is not an update command 450, the method continues at step 470 of FIG. 4B. otherwise, the method continues at step 452. In one embodiment, an update command includes the filename, record number which provides a starting point for the update, number of records to update. In one embodiment, the command includes a parameter indicating whether records are to be inserted between the starting point and the next record, or whether the records are to be inserted in place of the starting point record and the number of following records equal to the number of records specified less 1. Additionally, the command includes the records or the file with which to perform the update. The filename is investigated to identify the type of the file 452 using any of the techniques described above. If the file type is a VSAM file 454, the record corresponding to the starting point record number received with the command of step 416 is located 456. The number of records corresponding to the command from the records received with the update command are either inserted or written in place of the records in the file beginning with the record number received with the command in step 416, depending on the parameter received with the command.

In one embodiment, if the file having the filename contained in the update command received in step 416 is not a VSAM file 454, the command received in step 416 includes the entire file. The file received with the command is copied in place of the file having the name specified in the command, and the file is DEQd to release the lock on the file 458. In another embodiment described above, when the file is read for update in step 446, the file copied is stored by the method of the present invention. The update command only contains records to be updated. These records are inserted by the method of the present invention into the copy of the file as part of step 458. The copy of the file with the inserted records is copied back into the storage from which the file was originally received in place of the file having the name specified in the command, and such file is DEQd.

Referring now to FIG. 4B, the method of the present invention began in FIG. 4A is continued. If the command received in step 416 of FIG. 4A is a delete command 470, the method continues at step 472, otherwise the method continues at step 484 described below. In one embodiment, a delete command identifies the file, starting record number and number of records to delete beginning with the starting record. The type of the file contained in the command is identified as described above 472. If the file type is a VSAM file 474, conventional VSAM commands, such as "READ DIR", "UPDATE" or "DELETE" are used to locate and update or delete the record or records to be deleted. If the file type is not a VSAM file 474, the file is ENQd and copied 478. In one embodiment, the entire file is provided 480, for example, to a client computer system so that the client computer system can perform the deletion. The client computer system then updates the file as described above. In another embodiment, once the file is copied in step 478, the records described in the command received in step 416 of the FIG. 4A are located and deleted by the method of the present invention. The copy of the file is stored in place of the original file, and the file is DEQd in order to unlock it. The method continues at step 416 of FIG. 4A.

In one embodiment of the present invention, the user may log off the system by sending a log off command. In such embodiment, if the command received in step 416 of FIG. 4A is a log off command 484, the command is received with a connection identifier or username. The connection identifier or username is used to locate the TCB identifier associated and stored with the connection identifier and user ID in step 414 of FIG. 4A. The TCB is used to free up the resources which were allocated to the TCB at step 412 of FIG. 4A, for example, by sending it in a command to an operating system that allocates such resources. The connection identifier and username is disassociated 488 from the task control block associated in step 414 of FIG. 4A, for example, by removing all three items from storage. If a counter is used to enforce a limit on the number of concurrent users that can use the method, the counter is decremented 490.

In one embodiment of the present invention, a user is logged off automatically using the steps 488, 490 described above if an abend is detected 486. In one embodiment, an abend is detected through conventional monitor techniques. The abend is detected and a notice is provided. When the notice is received, steps 488 and 490 are performed as if the user had sent a log off command. In one embodiment, step 486 may be performed before, during or after any other step in the method of the present invention, allowing steps 486, 488, 490 to interrupt or follow any step in the method of FIGS. 4A through 4C.

In one embodiment, the method of the present invention is performed in communication with one or more clients.

Figure 4D:
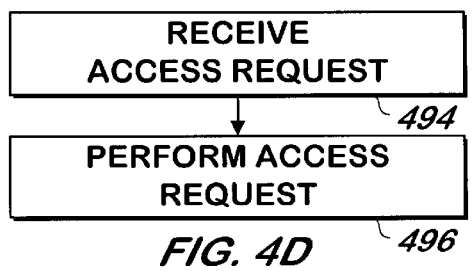
FIG. 4D is a flowchart illustrating a method of accessing for a user of a host computer terminal the file of accessed FIGS. 4A–4C that may be performed simultaneously with the method illustrated in FIGS. 4A–4C.

Multiple version of any of steps 410–490 may be performed simultaneously, with one version per client communicating. In one embodiment of the present invention, substantially at the same time as the method of the present invention, or interleaved with some or all of the steps contained therein, as shown in FIG. 4D, an access request from a terminal may be received 494, and such access request may be performed 496 for example by generating a conventional operating system command, providing it to the operating system, and having the operating system execute the command, all using conventional techniques. An access request may include reading one or more records, for example to view the records, updating one or more records, creating one or more records or deleting one or more records. The access request may be performed on a file including a file on which records are being read, read for update, updated or deleted as described above with reference to FIGS. 4A–4C. Such embodiment allows a client to receive access to a file through the method illustrated in FIGS. 4A–4C that is itself being accessed by a host application using the method illustrated in FIG. 4D.

Referring again to FIGS. 4A through 4C, in one embodiment, records or files provided in steps 430, 444, 446, or 480 may be converted to ASCII and/or compressed using conventional techniques. Files or records received at step 416 with the command or otherwise may be converted to EBCDIC and/or decompressed.

What is claimed is:

1. A method of providing access to a file on a first computer system to a user of a second computer system remotely coupled to the first computer system, the method comprising:
   receiving a request for a portion of the file;
   identifying a type of the file;
   responsive to the type of the file indicating a specified portion of the file may be retrieved:
      retrieving and storing a copy of less than all of the file; and
      providing the portion of the file from the copy of less than all of the file stored; and
   responsive to the type of the file indicating a specified portion of the file may not be retrieved:
      retrieving and storing a copy of the file; and
      providing the portion of the file from the copy of the file stored.

2. The method of claim 1 comprising the additional step of:
   responsive to the type of the file indicating a specified portion of the file may be retrieved:
      receiving an update of the portion of the file provided;
      incorporating the update received into the copy of less than all of the file; and
      inserting at least some of the copy of less than all of the file stored into the file incorporating the update; and
   responsive to the type of the file indicating a specified portion of the file may not be retrieved:
      receiving an update of the file provided;
      incorporating the update received into the copy of the file; and
      replacing the file with the copy of the file incorporating the update.

3. The method of claim 2 additionally comprising imposing a restriction on accessing the file before the retrieving and storing the copy of the file steps, responsive to the type of the file indicating a specified portion of the file may not be retrieved.

4. The method of claim 3 additionally comprising the step of removing the restriction on accessing the file after the replacing step, responsive to the type of the file indicating a specified portion of the file may not be retrieved.

5. The method of claim 2 wherein:
   the portion of the file comprises records; and
   the update comprises less than all of each of at least one record.

6. The method of claim 1 wherein:
   the portion of the file comprises a plurality of records; and
   the portion comprises less than all of each of at least one of the plurality of records.

7. The method of claim 1 comprising the additional steps of:
   requesting an allocation of resources;
   receiving an identifier of resources allocated responsive to the request; and
   associating the identifier of the resources received with an identifier of a connection associated with the second computer system.

8. The method of claim 7, comprising the additional steps of:
   receiving an indication of an abnormal termination of communication between the first computer system and the second computer system, said indication comprising an identifier of a connection to the second computer system; and
   responsive to the receiving the indication step:
      locating the identifier of the resources on the first computer system allocated to the second computer system; and
      requesting the resources be deallocated.

9. The method of claim 8, comprising the additional steps of:
   receiving a log on command; and
   responsive to the receiving the log on step, incrementing a counter indicating a number of client computer systems logged on.

10. The method of claim 9, comprising the additional step of, responsive to the receiving an indication step, decrementing the counter.

11. The method of claim 1, additionally comprising converting the portion of the file from a first character set to a second character set.

12. The method of claim 1 wherein the first character set is EBCDIC and the second character set is ASCII.

13. The method of claim 2 comprising the additional step of providing to a user logged in to the first computer system, access to the file between at least one of the providing steps and at least one of the inserting steps.

14. The method of claim 1, wherein the file is a member of a dataset, the method additionally comprising:
   receiving a request for a portion of an additional file in the dataset; and
   denying access to the additional file responsive to an identifier of a user associated with the request for the portion of the additional file.

15. A computer program product comprising a computer useable medium having computer readable program code embodied therein for providing access to a file on a first computer system to a user of a second computer system remotely coupled to the first computer system, the computer program product comprising:
   computer readable program code devices configured to cause a computer to receive a request for a portion of the file;

computer readable program code devices configured to cause a computer to identify a type of the file;
computer readable program code devices configured to cause a computer to:
responsive to the type of the file indicating a specified portion of the file may be retrieved:
retrieve and storing a copy of less than all of the file; and
provide the portion of the file from the copy of less than all of the file stored; and
responsive to the type of the file indicating a specified portion of the file may not be retrieved:
retrieve and storing a copy of the file; and
provide the portion of the file from the copy of the file stored.

16. The computer program product of claim 15 additionally comprising:
computer readable program code devices configured to cause a computer to:
responsive to the type of the file indicating a specified portion of the file may be retrieved:
receive an update of the portion of the file provided;
incorporate the update received into the copy of less than all of the file; and
insert at least some of the copy of less than all of the file stored into the file incorporating the update; and
responsive to the type of the file indicating a specified portion of the file may not be retrieved:
receive an update of the file provided;
incorporate the update received into the copy of the file; and
replace the file with the copy of the file incorporating the update.

17. The computer program product of claim 16 additionally comprising computer readable program code devices configured to cause a computer to impose a restriction on accessing the file before operation of the computer readable program code devices configured to cause the computer to retrieve and store the copy of the file, responsive to the type of the file indicating a specified portion of the file may not be retrieved.

18. The computer program product of claim 7 additionally comprising computer readable program code devices configured to cause a computer to remove the restriction on accessing the file after operation of the computer readable program code devices configured to cause a computer to replacing, responsive to the type of the file indicating a specified portion of the file may not be retrieved.

19. The computer program product of claim 16 wherein:
the portion of the file comprises records; and
the update comprises less than all of each of at least one record.

20. The computer program product of claim 15 wherein:
the portion of the file comprises a plurality of records; and
the portion comprises less than all of each of at least one of the plurality of records.

21. The computer program product of claim 15 additionally comprising:
computer readable program code devices configured to cause a computer to request an allocation of resources;
computer readable program code devices configured to cause a computer to receive an identifier of resources allocated responsive to the request; and
computer readable program code devices configured to cause a computer to associate the identifier of the resources received with an identifier of a connection associated with the second computer system.

22. The computer program product of claim 21, additionally comprising:
computer readable program code devices configured to cause a computer to receive an indication of an abnormal termination of communication between the first computer system and the second computer system, said indication comprising an identifier of a connection to the second computer system; and
computer readable program code devices configured to cause a computer to, responsive to the receiving the indication step:
locate the identifier of the resources on the first computer system allocated to the second computer system; and
request the resources be deallocated.

23. The computer program product of claim 22, additionally comprising:
computer readable program code devices configured to cause a computer to receive a log on command; and
computer readable program code devices configured to cause a computer to, responsive to the receiving the log on step, increment a counter indicating a number of client computer systems logged on.

24. The computer program product of claim 23, additionally comprising the additional step of, responsive to the receiving an indication step, decrement the counter.

25. The computer program product of claim 15, additionally comprising computer readable program code devices configured to cause a computer to convert the portion of the file from a first character set to a second character set.

26. The computer program product of claim 25 wherein the first character set is EBCDIC and the second character set is ASCII.

27. The computer program product of claim 16 additionally comprising computer readable program code devices configured to cause a computer to provide to a user logged in to the first computer system, access to the file between operation of at least one of the computer readable program code devices configured to cause a computer to provide and at least one of the computer readable program code devices configured to cause a computer to insert.

28. The computer program product of claim 15, wherein the file is a member of a dataset, the computer program product additionally comprising:
computer readable program code devices configured to cause a computer to receive a request for a portion of an additional file in the dataset; and
computer readable program code devices configured to cause a computer to deny access to the additional file responsive to an identifier of a user associated with the request for the portion of the additional file.

29. A system of providing access to a file on a first computer system to a user of a second computer system remotely coupled to the first computer system, the system comprising:
a record request receiver having an input coupled to a system input operatively coupled for receiving a request for a portion of the file, the record request receiver having an input/output for providing an identifier of the file responsive to the request and receiving a type of the file, the record request receiver additionally for providing at an output the identifier of the file and the type of the file received at the record request receiver input/output;

a file distinguisher having an input/output coupled to the record request receiver input/output, the file distinguisher for identifying and providing at the file distinguisher input/output the type of the file;

a file accessor having an input coupled to the record request receiver output for receiving the identifier of the file and the type of the file, the file accessor for, responsive to the type of the file indicating a specified portion of the file may be retrieved:

retrieving at a first port, and storing a copy of, less than all of the file; and providing at a second port the portion of the file from the copy of less than all of the file stored; and responsive to the type of the file indicating a specified portion of the file may not be retrieved:

retrieving at a first port, and storing, a copy of the file; and providing at a second port the portion of the file from the copy of the file stored.

30. The system of claim 29 wherein the file accessor is additionally for:

responsive to the type of the file indicating a specified portion of the file may be retrieved:

receiving at the second port an update of the portion of the file provided;

incorporating the update received into the copy of less than all of the file; and inserting via the first port at least some of the copy of less than all of the file stored into the file incorporating the update; and responsive to the type of the file indicating a specified portion of the file may not be retrieved:

receiving at the second port an update of the file provided;

incorporating the update received into the copy of the file; and replacing via the first port the file with the copy of the file incorporating the update.

31. The system of claim 30 wherein the file accessor additionally initiates a restriction on accessing the file via the first input/output before the retrieving and storing a copy of the file responsive to the type of the file indicating a specified portion of the file may not be retrieved.

32. The system of claim 31 wherein the file accessor additionally removes the restriction on accessing the file after replacing the file, responsive to the type of the file indicating a specified portion of the file may not be retrieved.

33. The system of claim 30 wherein:

the portion of the file comprises records; and the update comprises less than all of each of at least one record.

34. The system of claim 29 wherein:

the portion of the file comprises a plurality of records; and the portion comprises less than all of each of at least one of the plurality of records.

35. The system of claim 29, wherein:

the system receives a log on command prior to the request; and the system additionally comprises a TCB assignor having an input coupled to the system input, the TCB assignor for, responsive to receipt of a log on command at the system input, requesting at an input/output an allocation of resources, receiving at the TCB assignor input/output an identifier of resources allocated responsive to the request; and associating the identifier of the resources received with an identifier of a connection associated with the second computer system.

36. The system of claim 35, additionally comprising a log off manager having an input operatively coupled for receiving an indication of an abnormal termination of communication between the first computer system and the second computer system, said indication comprising an identifier of a connection to the second computer system, the log off manager for, responsive to the indication received at the log off manager input, locating the identifier of the resources on the first computer system allocated to the second computer system; and requesting via an output the resources be deallocated.

37. The system of claim 36, additionally comprising a concurrent user counter having an input coupled to the system input operatively coupled for receiving an indication of a log on command received at the system input, the concurrent user counter for incrementing a counter indicating a number of client computer systems logged on responsive to the indication of the log on command received at the concurrent user counter input.

38. The system of claim 37, wherein the concurrent user counter additionally receives the indication at the concurrent user counter input, the concurrent user counter additionally decrementing the counter responsive to the indication received at the concurrent user counter input.

39. The system of claim 29, wherein the file accessor is additionally for converting the portion of the file from a first character set to a second character set.

40. The system of claim 39 wherein the first character set is EBCDIC and the second character set is ASCII.

41. The system of claim 30 wherein the system provides access to the file to a user logged in to the first computer system, the access provided between a first time at which the file accessor provides the portion of the file and a second time at which the file accessor inserts the at least some of the copy of less than all of the file.

42. The system of claim 29, wherein the file is a member of a dataset, the system additionally comprising a security manager having an input operatively coupled for receiving a request for a portion of an additional file in the dataset, the request comprising an identifier of a user associated with the request for the portion of the additional file, the security manager for providing at an output an indication denying access to the additional file responsive to the identifier of a user.

* * * * *

UNITED STATES PATENT AND TRADEMARK OFFICE
CERTIFICATE OF CORRECTION

PATENT NO. : 6,253,236 B1
DATED : June 26, 2001
INVENTOR(S) : Douglas D. Troxel et al.

Page 1 of 1

It is certified that error appears in the above-identified patent and that said Letters Patent is hereby corrected as shown below:

<u>Claim 12,</u>
Line 1, delete "1" and insert in place thereof -- 11 --.

Signed and Sealed this

Fifteenth Day of January, 2002

Attest:

Attesting Officer

JAMES E. ROGAN
Director of the United States Patent and Trademark Office